(12) United States Patent
Nakao et al.

(10) Patent No.: US 6,636,264 B1
(45) Date of Patent: Oct. 21, 2003

(54) PORTABLE ELECTRONIC APPARATUS

(75) Inventors: Soichiro Nakao, Asaka (JP); Takayuki Hayashida, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/314,136

(22) Filed: May 19, 1999

(30) Foreign Application Priority Data

May 20, 1998 (JP) ............................................ 10-138928

(51) Int. Cl.[7] ................................................ H04N 5/225
(52) U.S. Cl. .................................. 348/375; 348/207.99
(58) Field of Search ........................ 348/207.99, 333.01, 348/333.05, 373, 374, 375, 376; 345/354, 173; 346/281, 299, 292, 543

(56) References Cited

U.S. PATENT DOCUMENTS 6,154,210 A * 11/2000 Anderson .................... 345/840
6,215,523 B1 * 4/2001 Anderson ............... 348/333.05
6,341,202 B1 * 1/2002 Hosokawa et al. ......... 396/281
6,357,716 B1 * 3/2002 Kratish et al. .............. 248/466

FOREIGN PATENT DOCUMENTS

EP           0946045 A2 * 9/1999 ............ H04N/1/21

* cited by examiner

*Primary Examiner*—Tuan Ho
(74) *Attorney, Agent, or Firm*—Birch, Stewart, Kolasch & Birck, LLP

(57) ABSTRACT

In a portable electronic apparatus, control parts are concentrated in a small space, and they can be operated easily by one hand. A mode dial is provided on the back of a casing of the apparatus, at a position where the thumb of the right hand holding a grip part at the right of the casing is naturally positioned. A cross key is arranged at the left side of the mode dial. The cross key is used as a control key for selecting a variety of setting items and entering commands to change the settings. A menu/execution key for fixing the items and settings selected/changed with the cross key is arranged at the lower left of the cross key. It is therefore possible to perform a sequence of operations by moving the thumb efficiently.

8 Claims, 5 Drawing Sheets

PORTABLE ELECTRONIC APPARATUS

BACKGROUND OF THE INVENTION

1. Field of the Invention

The present invention relates generally to a portable electronic apparatus, and more particularly to the structure and arrangement of control parts on a casing of a portable electronic apparatus.

2. Description of Related Art

A variety of control members such as a push button, a slide switch and a rotary dial are used for control parts of a portable electronic apparatus such as an electronic camera and a personal digital assistant (PDA). The size and operability of the portable electronic apparatus depend on what types of control parts are used and how they are arranged on a casing of the portable electronic apparatus.

In particular, as the portable electronic apparatus has recently become smaller and has had more functions, it is important to secure a space for the control parts and improve the operability in the development of the apparatus.

SUMMARY OF THE INVENTION

In view of the foregoing, it is an object of the present invention to provide a portable electronic apparatus whose control parts are concentrated, and which can be operated easily by one hand.

To achieve the above-mentioned object, the present invention is directed to a portable electronic apparatus comprising: a casing; a dial control part for selecting a mode among a plurality of modes of the portable electronic apparatus; and a cross key control part for performing at least one of selecting an item in the mode selected by the dial control part and entering a command; wherein the dial control part is arranged on the casing at such a position as to be operated by a thumb of a hand holding a part of the casing, and the cross key control part is arranged on the casing close to the dial control part, at such a position as to be operated by the thumb.

According to the present invention, it is possible to select a mode only by rotating the dial control part by the thumb of one hand holding the apparatus. It is also possible to easily operate the cross key control part only by shifting the thumb from the dial control part. The cross key control part may comprise a button member capable of tilting upward, downward, rightward, and leftward.

The dial control part preferably has a concave part at a center of a face thereof, whereby the dial control part can also be used as a thumb rest, the thumb being placed securely on the concave part while the dial control part is not operated. Thus, there is no necessity of securing a special space for the thumb rest. Moreover, the thumb can be placed securely on the concave part at the center of the dial.

Preferably, the portable electronic apparatus further comprises an execution button for fixing the item selected by the cross key control part, the execution button being arranged on the casing at such a position as to be operated by the thumb and at an opposite side of the dial control part across the cross key control part. Since the dial control part, the cross key control part and the execution button are arranged side by side in that order, it is possible to perform a sequence of operations by moving the thumb efficiently. The mode is selected by the dial control part, the detailed settings are selectively entered by the cross key control part, and the settings are fixed by the execution button.

For example, the portable electronic apparatus further comprises: an imaging device for converting a light from a subject into image data; a storage medium interface for recording the image data obtained by the imaging device into an external storage medium, and for reading data recorded in the external storage medium; and a flat display for displaying at least one of an image represented by the image data obtained by the imaging device and an image represented by the data read from the external storage medium. That is, the portable electronic apparatus may be an electronic camera.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
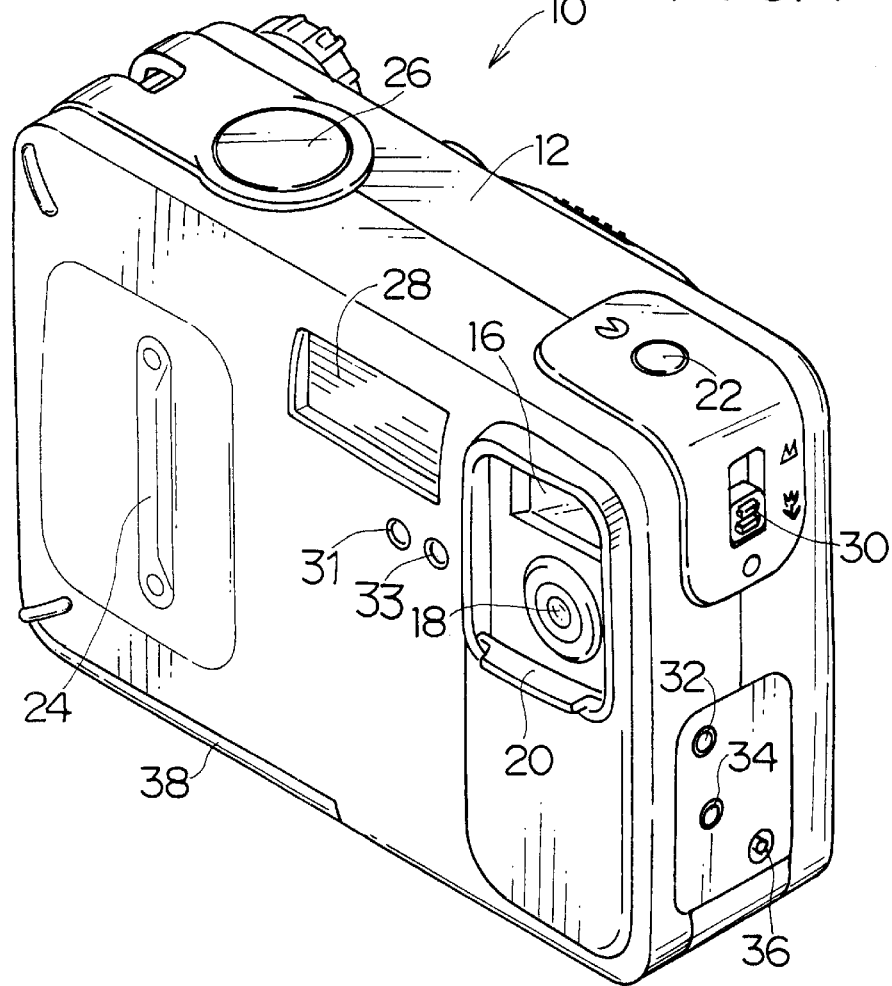
FIG. 1 is a perspective view showing an electronic camera according to an embodiment of the present invention.

FIG. 1 shows an electronic camera 10 according to an embodiment of the present invention. As shown in FIG. 1, the electronic camera 10 has a substantially rectangular-parallelepiped casing 12. A finder window 16 and a taking lens 18 are arranged vertically at the right side of the front of the casing 12. Various types of finders and lenses may be used; for example, an Albada finder and a short focus lens with a focal length of about 4 mm. An imaging device or a charge-coupled device (CCD) is arranged behind the taking lens 18. The number of pixels in the CCD should be determined according to a desired image quality. The number of pixels is preferably three hundred and fifty thousand or more. The imaging device is not necessarily the CCD, but it may also be other kinds of imaging devices such as a metal oxide semiconductor (MOS) type imaging device and a charge injection device (CID), or an imaging tube.

A lens cover 20, which is vertically slidable, is provided at the front of the finder window 16 and the taking lens 18. Pressing a cover opening button 22 at the top of the casing 12 unlatches the lens cover 20 from a stopper mechanism (not shown), and a forcing means such as a spring slides the lens cover 20 downward. Consequently, the finder window 16 and the taking lens 18 are opened to become capable of capturing an image. When the camera 10 is not used, the lens cover 20 is slid up to cover the finder window 16 and the taking lens 18. When completely closed, the lens cover 20 is held by the stopper mechanism to thereby protect the finder window 16 and the taking lens 18.

A grip part 24 is formed at the left part of the casing 12 in FIG. 1 so that the operator can easily hold the camera 10 with the right hand. A release button 26 is arranged at the top of the casing 12. The release button 26 is pressed in two steps. When the release button 26 is pressed half, an automatic focusing (AF) and an automatic exposure control (AE) operate to lock the AF and the AE. When the release button 26 is pressed completely, an image-recording start signal is transmitted to start recording the image.

An electronic flash 28 is provided at the central upper part of the front of the casing 12, and an electronic flash control sensor 31 and a self-timer lamp 33 are arranged horizontally below the electronic flash 28. Since the electronic flash 28 is arranged closer to the central part than the grip part 24 as shown in FIG. 1, the operator's hand holding the grip part 24 does not touch or cover the electronic flash 28.

An object distance setting switch 30 is provided at the right side of the casing 12. Vertically sliding the switch 30 selects suitable setting of an optical system for a close-up or a long shot. A digital input/output terminal 32, a video output terminal 34 and a power supply terminal 36 are provided at the right side of the casing 12.

Figure 2:
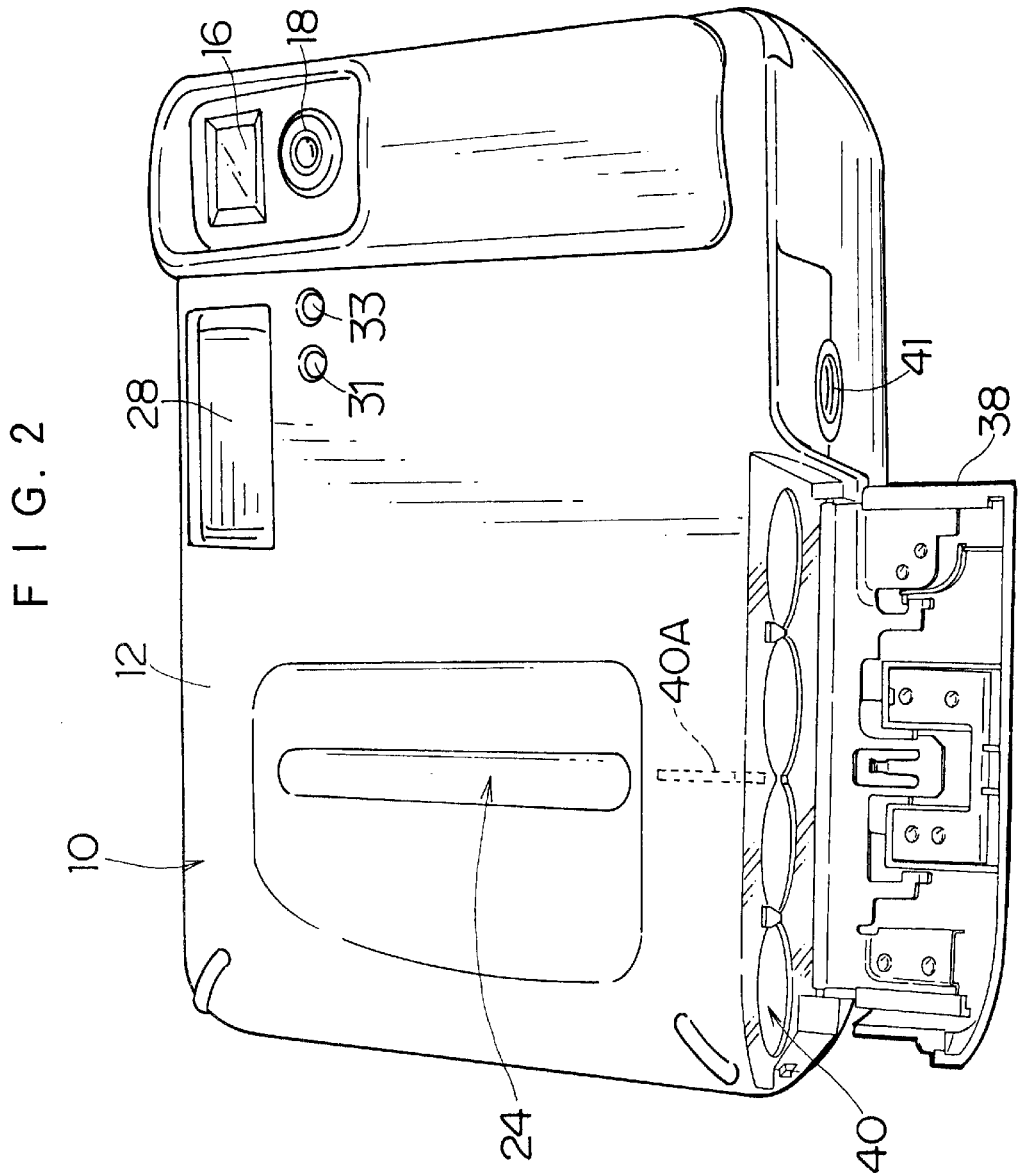
FIG. 2 is a perspective bottom view showing the electronic camera in FIG. 1.

A battery cover 38 is openably attached at the bottom of the casing 12 with a hinge mechanism (not shown). Sliding the battery cover 38 to the front in FIG. 1 unlatches the battery cover 38 from a stopper mechanism (not shown), which usually holds the battery cover 38 close, and opens the battery cover 38 downward. As shown in FIG. 2, a battery chamber 40 contains four batteries (e.g., size AA batteries) (not shown) which are substantially columnar. The four batteries are arranged in such a manner that the longitudinal direction thereof is the vertical direction of the casing 12. After the four batteries are inserted into the battery chamber 40 from below the casing 12, the battery cover 38 is closed in a procedure reverse to the cover opening procedure. Consequently, the stopper mechanism holds the battery cover 38 close, and the loading of the batteries is completed. Reference numeral 40A in FIG. 2 is a support in the battery chamber 40, and 41 is a screw hole for fixing a tripod.

Figure 3:
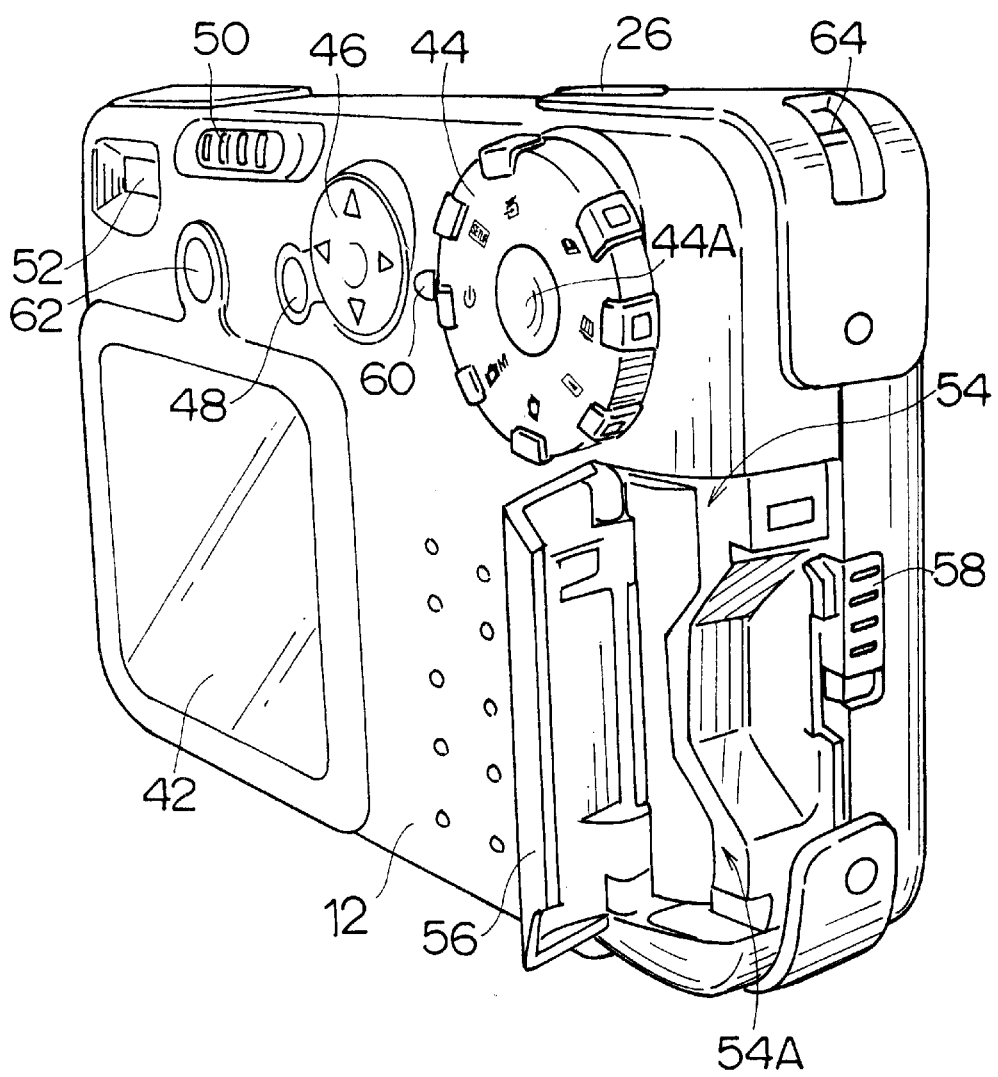
FIG. 3 is a perspective back view showing the electronic camera in FIG. 1.

FIG. 3 is a perspective back view of the electronic camera 10 in FIG. 1.

A flat display or an LCD 42, a mode dial 44, a cross key (an upper/lower key and a right/left key) 46, a menu/execution key 48, a power switch 50, a finder eyepiece 52 are arranged at the back of the casing 12.

An inlet 54A of a storage medium chamber 54 is arranged at the right side of the casing 12 in FIG. 3 (at the same side at which the grip part 24 is provided). An external storage medium or a memory card (e.g., a smart medium) is inserted into and extracted from the storage medium chamber 54 through the inlet 54A. In this electronic camera 10, the smart medium (an image memory card) is used as the external storage medium for recording the image data, but it is also possible to use various types of storage mediums such as a PC card, a flash memory card, an IC card, a floppy disk, a magneto-optical (MO) disk, an optical disk, and a memory stick.

On the casing 12, the inlet 54A is arranged in such a way that the longitudinal direction thereof is vertical. Hence, the smart medium can be inserted and extracted along a plane perpendicular to an optical axis of the taking lens 18. A lid 56 for covering the inlet 54A is openably attached at the casing 12 with a hinge mechanism. Sliding a cover opening slider 58 down in FIG. 3 unlatches the lid 56 from a stopper means (not shown) to open the lid 56. When the lid 56 is closed, the stopper means holds the lid 56 close.

The LCD 42 displays images captured through the imaging system, which comprises the taking lens 18 and the CCD, and images (including characters) represented with data read from the smart medium inserted to the storage medium chamber 54. For example, a 2-inch low temperature polysilicon LCD is used as the LCD 42. The LCD 42 is arranged at the left of the storage medium chamber 54 on the back of the casing 12. The LCD 42 and the storage medium chamber 54 are arranged horizontally on a substrate 66 (see FIG. 4) without overlapping along the depth of the casing 12. Thus, the LCD 42 is arranged at the lower left corner of the casing 12, so that the LCD 42 is away from the grip part 24 as shown in FIG. 3.

The mode dial 44 is provided at the upper right corner of the back of the casing 12 in FIG. 3, that is, at the position where the thumb of the right hand holding the grip part 24 is naturally positioned. The functions (modes) of the camera 10 are changed according to the set positions of the mode dial 44. For example, eight marks or characters representing the following modes are put sequentially along the circumference of the mode dial 44: "setup", "self-timer", "manual image-recording", "automatic image-recording", "reproduction", "erasure", "protection", and "connection to a personal computer (PC)."

To select a mode, the mode dial 44 is rotated clockwise or counterclockwise in FIG. 3 to set the mark or the character representing a desired mode to an index 60. A small concave part 44A is formed at the center of the mode dial 44. The thumb is placed on the concave 44A while the mode dial 44 is not operated. The mode dial 44 thus serves as a thumb rest, and this eliminates the necessity of providing a special space for placing the thumb. In addition, the thumb can be placed on the concave part 44A in a stable condition, and the operator can securely hold the camera 10.

The cross key 46 is arranged at the left of the mode dial 44. The cross key 46 is tiltable in four perpendicular directions, and it is shaped like a dish with a concave center. Four triangular marks are put on a inclined surface, which is formed from the peripheral part to the center of the cross key 46, to indicate upward, downward, right and left directions.

Pressing one of the triangular marks tilts the cross key 46, and the designation of the corresponding direction can be entered. The cross key 46 is used as an operation key to select a variety of setting items, change the settings, adjust the magnification of the electronic zooming, move the zooming center, and forward and reverse the reproduced frames.

The menu/execution key 48 is arranged at the lower left of the cross key 46. The menu/execution key 48 is used to confirm the setting item selected or changed by the cross key 46 and to display a menu showing a list of setting items on the LCD 42.

A display key 62 is provided at the center of the upper side of the LCD 42. The LCD 42 is turned on and off alternately by pressing the display key 62. When the display key 62 is pressed to turn on the LCD 42 in the image-recording mode, an image (a moving picture) captured through the imaging system is displayed on the screen. Then, the operator looks at the screen while determining a picture composition.

In FIG. 3, a strap attachment part 64 is provided at the top of the right side of the casing 12.

A description will now be given of the operation of the electronic camera 10, which is constructed in the above-mentioned manner.

Figure 4:
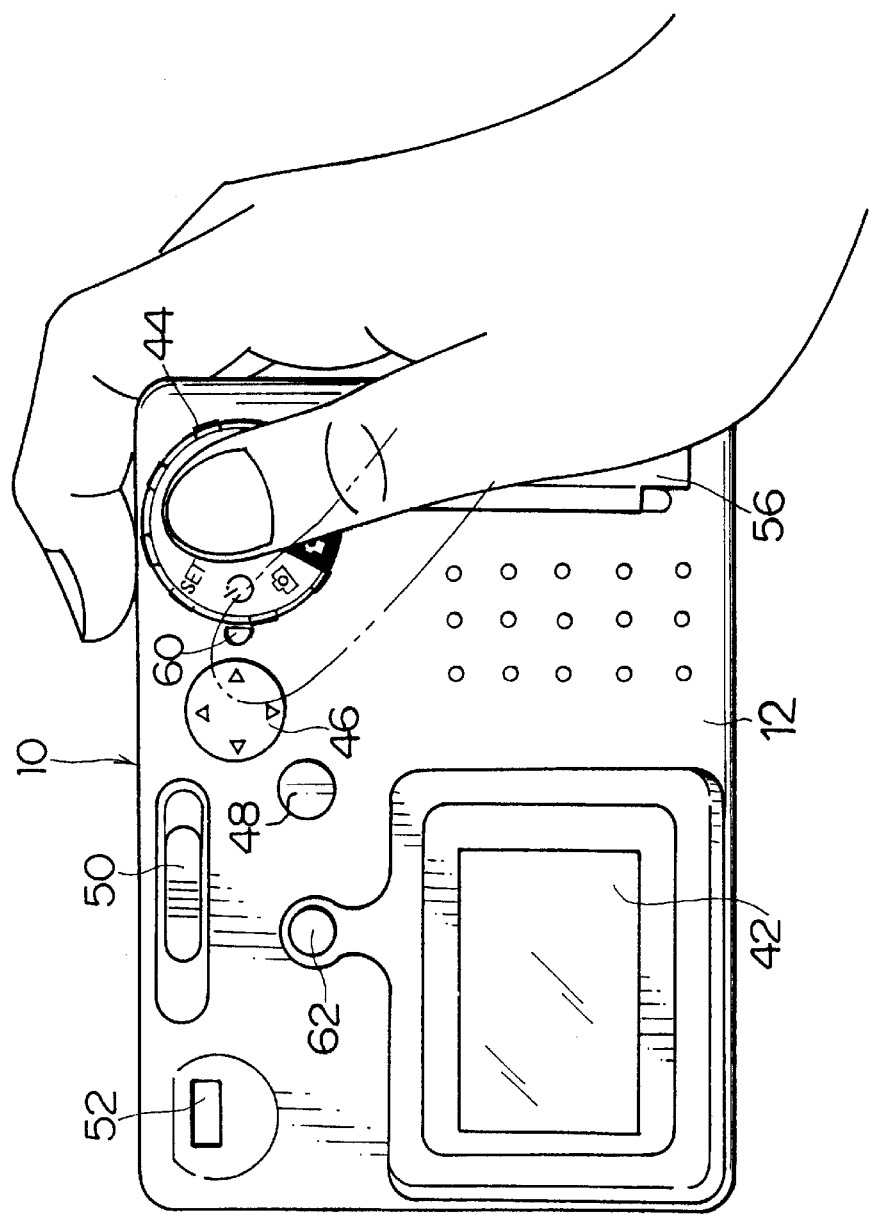
FIG. 4 is a back view showing the electronic camera held by a hand.

As shown in FIG. 4, in the electronic camera 10, all the control parts such as the mode dial 44, the cross key 46 and the menu/execution key 48 are arranged at the back of the casing 12 in such a way as to be operated by the thumb of the right hand holding the grip part 24. Thus, the operator can operate the control parts with one hand. In particular, the mode dial 44, the cross key 46 and the menu/execution key 48 are arranged so that the operator can enter desired commands by efficiently moving the thumb from the right to the left in the sequence of operations.

When the operator, who holds the grip part 24 of the casing 12 with the right hand, slides the power switch 50 to the right in FIG. 4, an opening screen is displayed on the LCD 42. When the operator releases the power switch 50, a forcing means (not shown) returns the power switch 50 to its original position.

Then, the operator rotates the mode dial 44 to set a desired mode. When the mode dial 44 is set to "SETUP," a setup screen is displayed on the LCD 42. The operator operates the upper/lower keys of the cross key 46 to select an item to be changed on the setup screen. The operator changes the setting by operating the right/left keys of the cross key 46 to enter a desired setting. Every time the right/left keys of the cross key 46 are pressed, the settings are changed. After a desired setting is displayed, the right/left keys are no longer pressed. To fix the setting, the operator presses the menu/ execution key 48 or switches the mode dial 44 to another mode.

In the self-timer image-recording mode, an image can be recorded after about ten seconds since the self-timer is set. When the mode dial 44 is set to the self-timer, the word "SELF-TIMER" is displayed on the LCD 42. When the release button 26 is half pressed after the picture composition is determined, the AE and AF functions start operating. On completion of the focusing and exposure, the word "STANDBY" is displayed on the LCD 42. When the release button 26 is completely pressed, the self-timer lamp 33 at the front of the casing 12 blinks, and the image is recorded about ten seconds after.

In the manual image-recording mode, the operator confirms the image captured by the imaging system and determines whether to store the image in the smart medium inserted in the storage medium chamber 54. In this mode, it is possible to set a white balance, a brightness (an exposure value), a brightness of the electric flash 28 and a multiple image-recording. When the mode dial 44 is set to the manual image-recording mode, a list of setting items is displayed on the LCD 42. The operator selects the item by operating the right/left keys of the cross key 46, and changes the settings by operating the upper/lower keys of the cross key 46. Then, the operator fixes the settings by pressing the menu/ execution key 48. If the menu/execution key 48 is pressed during the entering of the settings, the original menu screen is displayed.

If the display key 62 is pressed in the manual image-recording mode, a moving picture, which is captured through the imaging system and has not been recorded, is displayed on the LCD 42. After the operator determines the picture composition while looking at the LCD 42 and half presses the release button 26, the camera 10 automatically performs the focusing and the exposure. On completion of preparations for recording the image (on completion of the AF and AE), the word "STANDBY" is displayed on the LCD 42.

Then, when the release button 26 is pressed completely, the picture on the LCD 42 freezes and a preview picture (a recorded frozen picture) is displayed on the LCD 42. If the operator determines not to store the image data of the preview picture into the smart medium, the operator presses the lower key of the cross key 46 to display the moving picture again. If the operator stores the image data of the preview picture into the smart medium, the operator presses the menu/execution key 48. While the image data is being stored into the smart medium, the next image can not be recorded. After the storing process is completed, the moving picture is displayed again.

In the automatic image-recording mode, the camera 10 automatically controls the exposure (a combination of an electronic shutter value and an aperture value) and the focus, and the image data read from the CCD is automatically recorded in the smart medium in response to the full press of the release button 26. In the automatic image-recording mode, the image can be recorded easily. Thus, the mode dial 44 is mainly set to the automatic image-recording mode in order to perform regular image-recording but special image-recording.

If the operator uses the optical finder to determine the picture composition, the operator looks an object through the finder eyepiece 52 to determine the picture composition by matching an AF frame mark, which appears substantially at the center of a finder visual field, with the object, and half-presses the release button 26 to activate the AE and AF functions. When the operator completely presses the release button 26, the image is recorded, that is, the image data read from the CCD is recorded in the smart medium through a predetermined signal processing.

On the other hand, if the operator uses the LCD 42 to determine the picture composition, the operator sets the mode dial 44 to the automatic image-recording mode and presses the display key 62. Then, the moving picture, which is captured through the imaging system and has not been recorded, is displayed on the LCD 42. The operator can look at the LCD 42 while determining the picture composition. Then, the operator operates the release button 26 to record the image in the above-described procedure.

In the image-recording using the LCD 42, a digital zoom (electronic zoom) image-recording can be performed. More specifically, if the upper key of the cross key 46 is pressed while the moving picture is displayed on the LCD 42, a mark "x2" is displayed at the upper left corner of the screen of the LCD 42. The central part of the image is enlarged with the magnification of 2 around the center of the image. In this case, if the operator operates the release button 26 to record the image, the data of the enlarged image is recorded in the smart medium. If the lower key of the cross key 46 is pressed, the enlargement is cancelled.

In the reproduction mode, the recorded image in the smart medium inserted in the storage medium chamber 54 is reproduced on the LCD 42 or output to the outside equipment such as a personal computer. For example, the images are reproduced on a frame-by-frame basis; multiple images are reproduced at once; or the images are reproduced sequentially at regular intervals from a designated frame (automatic play). It is also possible to enlarge the reproduced image in electronic zooming, copy the image data to another medium, change the tone of the recorded image and change the number of pixels (resizing). A desired command is entered by operating the cross key 46 and the menu/ execution key 48.

When the mode dial 44 is set to the reproduction mode, the image in the last frame recorded in the smart medium inserted in the storage medium chamber 54 is reproduced and is displayed on the LCD 42, etc. To reproduce an image in another frame, the right/left keys of the cross key 46 are operated to turn the frames. If the right key is pressed, the reproduced frame is forwarded by one frame. If the left key is pressed, the reproduced frame is reversed by one frame.

While an image of one frame is reproduced, the reproduction zooming can be performed. More specifically, if the upper/lower keys of the cross key 46 are pressed while the image is reproduced, the central part of the image is enlarged with a magnification of 1 to 4 around the center of the image in accordance with the pressing operation of the cross key 46. In this case, the upper key serves as an enlargement key, and the lower key serves as a reduction key.

In the erasure mode, the image data recorded in the smart medium is erased. The items and the frame numbers are selected with the upper key 46 and fixed with the menu/execution key 48 in the menu selection screen displayed on the LCD 42. In the erasure mode, it is possible to erase one frame, erase all frames, and format the smart medium.

In the protection mode, the image data is made read-only data in order to prevent the recorded image data from being erased by mistake. It is possible to protect the image data or cancel the protection on a frame-by-frame basis, and cancel the protection for all frames at once. In the protection mode, the items and the frame numbers are selected with the upper key 46 and fixed with the menu/execution key 48 in the menu selection screen displayed on the LCD 42.

In the PC mode, the electronic camera 10 is connected to a personal computer through a cable to send and receive image data to and from the personal computer. The PC mode is set to send the recorded image to the personal computer, or to record or erase image data in the smart medium with the personal computer.

According to the electronic camera 10 of this embodiment, it is possible to easily operate the control parts such as the mode dial 44, the cross key 46, the power switch 50, the display key 62 and the menu/execution key 48 with only the thumb of the right hand, which is holding the grip part 24. In particular, the operator can securely change the display on the LCD 42 by operating the control parts (the mode dial 44 and the cross key 46) while looking at the display on the LCD 42 without covering the LCD 42 by the hand.

Figure 5:
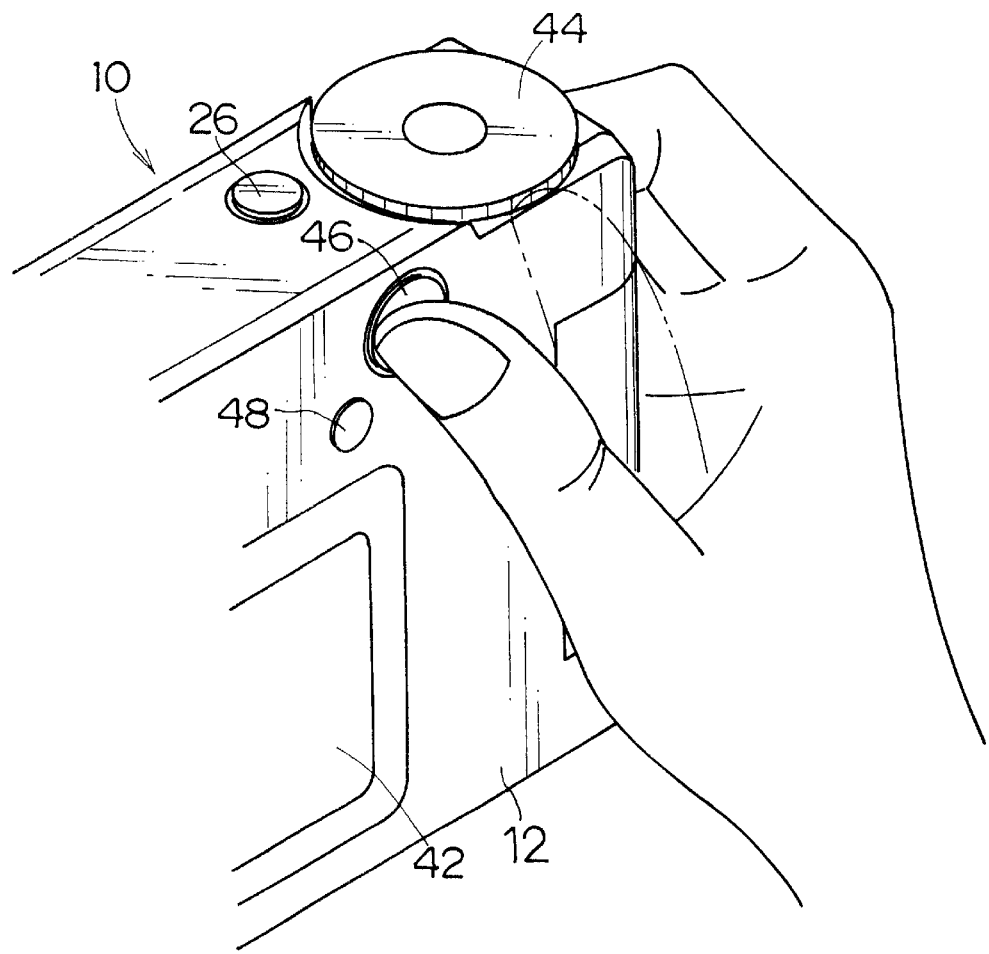
FIG. 5 is a perspective view showing the essential parts of an electronic camera according to another embodiment of the present invention.

In this embodiment, the mode dial 44 is provided at the back of the casing 12, but the arrangement is not restricted to this. For example, it is also possible to provide the mode dial 44 at the top of the casing 12 as shown in FIG. 5.

In this embodiment, the LCD is used as the flat display, but the display is not restricted to the LCD. For example, an electroluminescence (EL) display, a light emitting diode (LED) display, a plasma display, or the like may also be used.

In this embodiment, the present invention is applied to the electronic camera, but the present invention may also be applied to any kinds of portable electronic apparatus that has a flat display, such as an electronic book and a portable information terminal.

As set forth hereinabove, the dial control part and the cross key control part are provided at such positions as to be operated by the thumb of the hand holding a part of the casing of the apparatus. Thus, the control functions can be concentrated in the small space, and they can be operated easily by the thumb of one hand.

In particular, the execution button for fixing the selection with the cross key control part is provided at the opposite side of the dial control part across the cross key control part. The dial control part, the cross key control part and the execution button are arranged side by side in that order. Thus, the operator can perform a sequence of operations by efficiently moving the thumb.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A portable electronic apparatus comprising:
   a casing;
   a dial control for selecting a mode among a plurality of modes of the portable electronic apparatus; and
   a cross key control for performing at least one of selecting an item in the mode selected by the dial control and entering a command;
   wherein the dial control is arranged on the casing at such a position as to be operated by a thumb of a hand holding a part of the casing, and the cross key control is arranged on the casing juxtaposed to the dial control, at such a position as to be operated by shifting the thumb to a side.

2. The portable electronic apparatus as defined in claim 1, wherein the cross key control comprises a button member capable of tilting upward, downward, rightward, and leftward.

3. The portable electronic apparatus as defined in claim 1, wherein the dial control has a concave part having a stable position at a center of a face thereof, whereby the dial control can also be used as a thumb rest, the thumb rest being placed securely on the concave part while the dial control is not operated.

4. The portable electronic apparatus as defined in claim 1, further comprising an execution button for fixing the item selected by the cross key control and for displaying a menu of setting items, the execution button being arranged on the casing at such a position as to be operated by the thumb and at an opposite side of the cross key control than the dial control.

5. The portable electronic apparatus as defined in claim 1, further comprising:
   an imaging device for converting a light from a subject into image data;
   a storage medium interface for recording the image data obtained by the imaging device into an external storage medium, and for reading data recorded in the external storage medium; and
   a flat display for displaying at least one of an image represented by the image data obtained by the imaging device and an image represented by the data read from the external storage medium.

6. The portable electronic apparatus as defined in claim 5, wherein the cross key control comprises a button member capable of tilting upward, downward, rightward, and leftward.

7. The portable electronic apparatus as defined in claim 5, wherein the dial control has a concave part having a stable position at a center of a face thereof, whereby the dial control can also be used as a thumb rest, the thumb rest being placed securely on the concave part while the dial control is not operated.

8. The portable electronic apparatus as defined in claim 5, further comprising an execution button for fixing the item selected by the cross key control and for displaying a menu of setting items, the execution button being arranged on the casing at such a position as to be operated by the thumb and at an opposite side of the cross key control than the dial control.

\* \* \* \* \*